United States Patent [19]

Hirano

[11] Patent Number: 4,569,423
[45] Date of Patent: Feb. 11, 1986

[54] TRACTION MACHINE FOR AN ELEVATOR

[75] Inventor: Yasutaka Hirano, Inazawa, Japan

[73] Assignee: Mitsubishi Denki Kabushiki Kaisha, Tokyo, Japan

[21] Appl. No.: 500,913

[22] Filed: Jun. 3, 1983

[30] Foreign Application Priority Data

Sep. 3, 1982 [JP] Japan .................................. 57-153507

[51] Int. Cl.[4] ............................................. B66B 11/04
[52] U.S. Cl. ...................................... 187/20; 403/351; 384/255
[58] Field of Search ................... 187/20; 403/351, 365, 403/DIG. 7; 33/412, 182, DIG. 8; 384/255

[56] References Cited

U.S. PATENT DOCUMENTS 1,694,663 12/1928 Ohler ..................................... 254/329
4,422,531 12/1983 Ohtomi .................................. 187/20

FOREIGN PATENT DOCUMENTS 113696 9/1981 Japan .
574 1/1982 Japan .
590202 7/1947 United Kingdom ................... 287/53

Primary Examiner—Joseph J. Rolla
Assistant Examiner—Louise S. Heim
Attorney, Agent, or Firm—Wenderoth, Lind & Ponack

[57] ABSTRACT

A traction machine for an elevator wherein a reduction gear for the traction machine rotatably mounts a first and second parallel spaced shafts such as an output and intermediate shafts inside the gear box by the wall of the gear box. First and second rotors such as helical gears are fixed on the shafts so as to mesh with each other, and at least one of the shafts has each end supported by the wall through a support element which includes first and second support members that are respectively rotatably supported by their outer and inner cylindrical peripheries, respectively, the eccentric inner cylindrical periphery formed in the outer cylindrical periphery of the first support member being adapted to rotatably support the end of the shaft, whereas the outer cylindrical periphery of the second support member within which is eccentrically formed the inner cylindrical periphery is adapted to be secured to the wall of the gear box with the relative rotational position as well as to the first support member being suitably adjusted for the purpose of reducing or adjusting the backlash or the mesh of the rotors.

10 Claims, 11 Drawing Figures

U.S. Patent  Feb. 11, 1986  Sheet 3 of 4  4,569,423
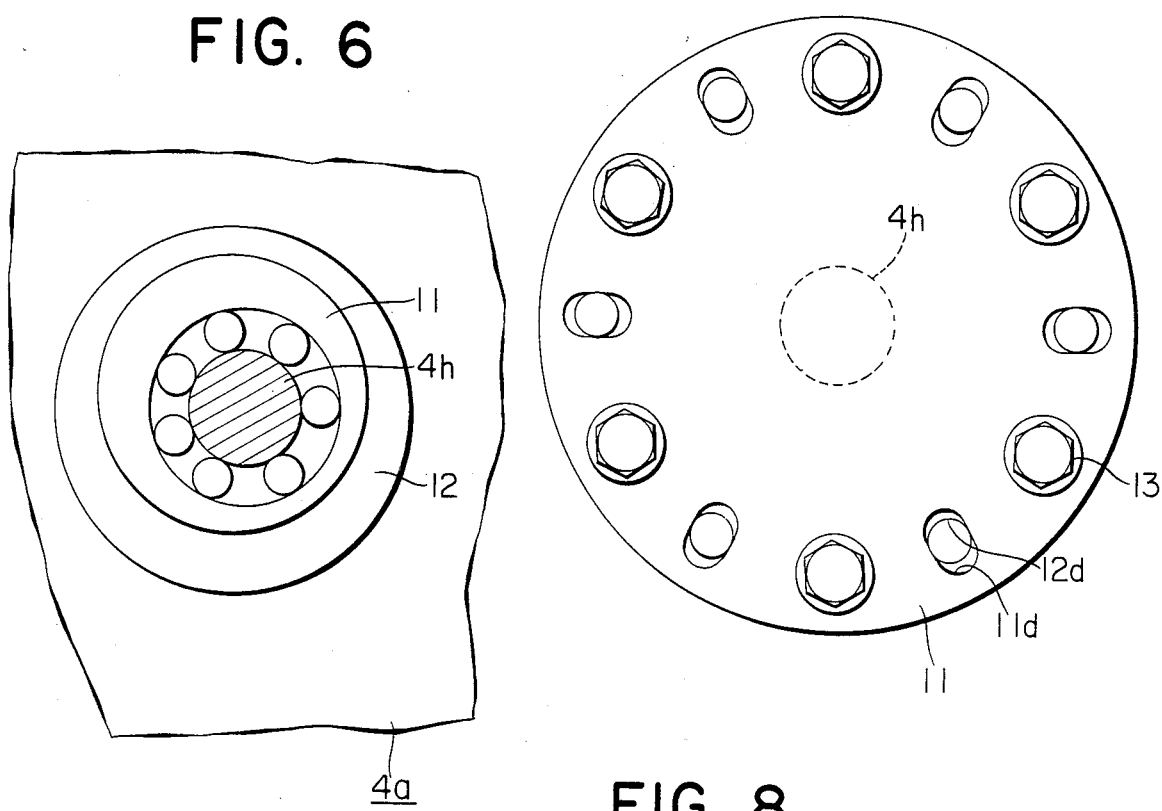
FIG. 6
FIG. 7
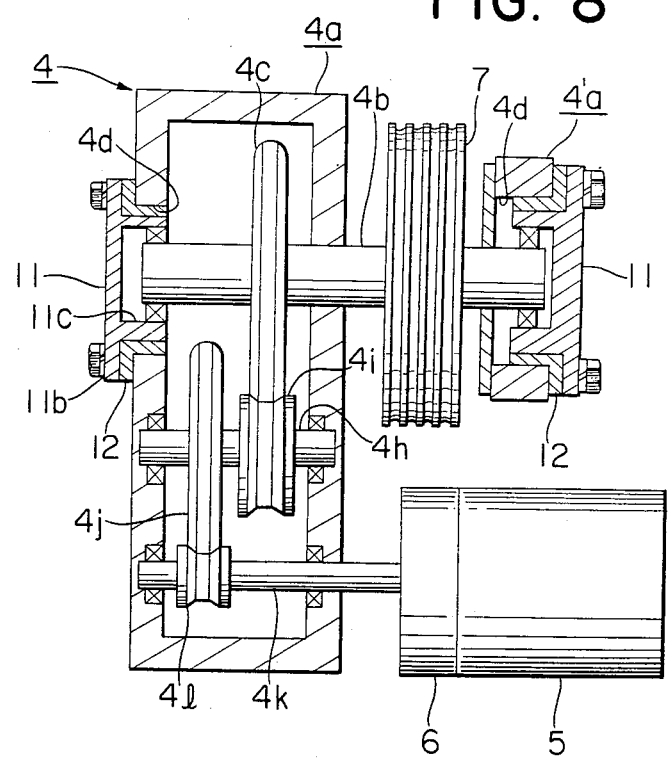
FIG. 8

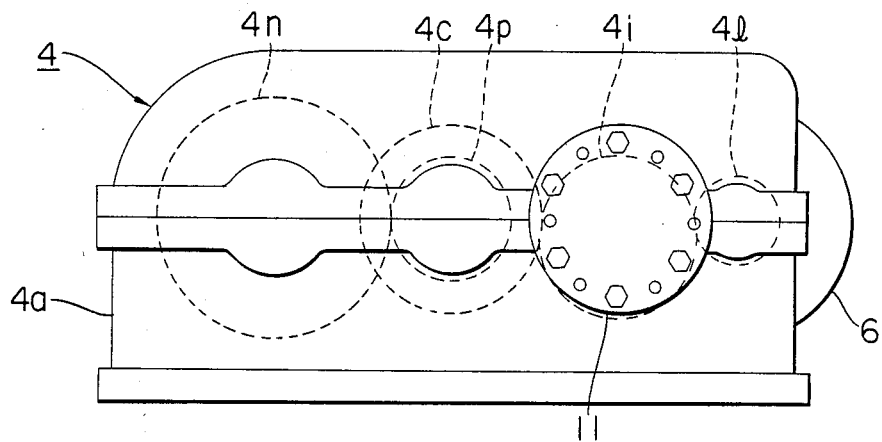
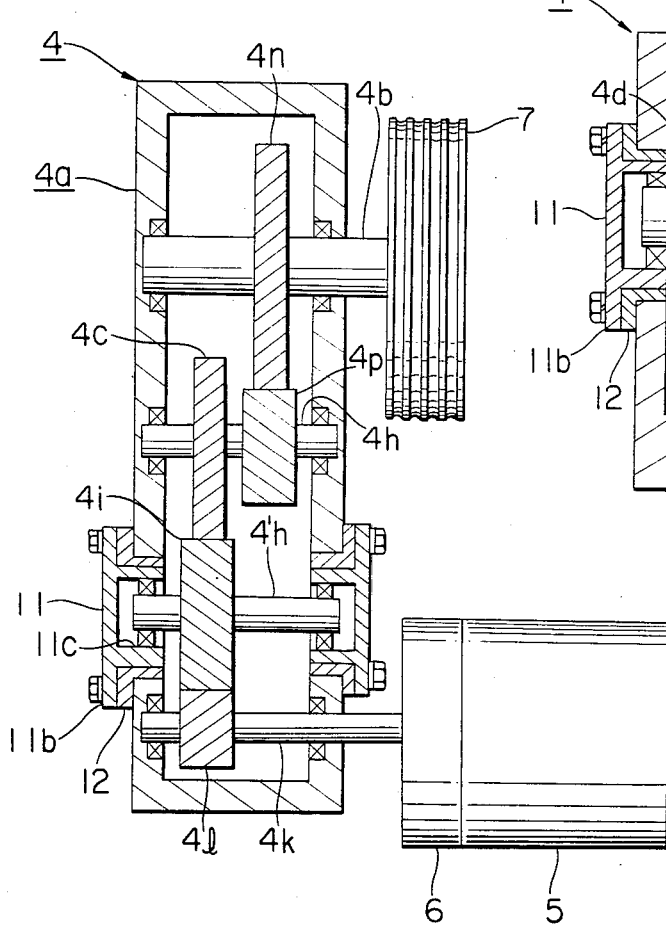
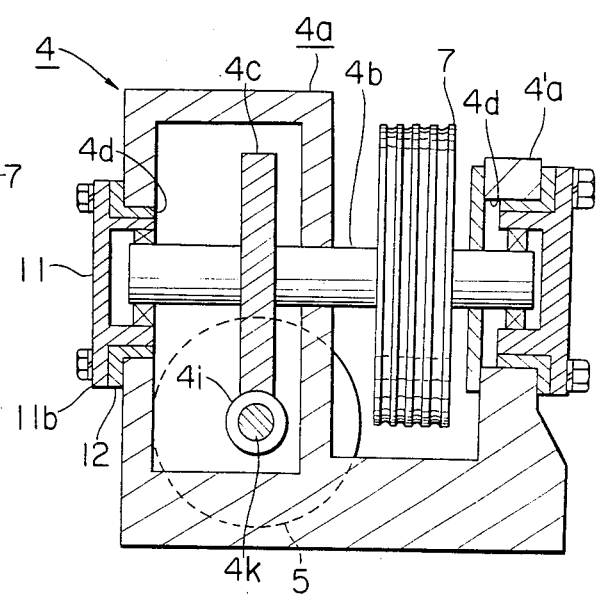

TRACTION MACHINE FOR AN ELEVATOR

BACKGROUND OF THE INVENTION

The present invention relates to an elevator and more particularly to a traction machine for an elevator which is provided with a reduction gear that rotatably mounts spaced parallel shafts with gears being respectively secured thereon so as to be engaged with each other.

Firstly, a conventional traction machine for an elevator of this type will be explained with reference to FIGS. 1 to 3 of the attached drawings.

In the drawings the reference numeral 1 denotes beams installed in a machine room (not shown), reference numeral 2 denotes a traction machine platform supported on beams 1 through rubber vibration isolators 3, and reference numeral 4 denotes a reduction gear mounted to traction machine platform 2. Reduction gear 4 comprises a gear housing 4a of generally rectangular cross section, an output shaft 4b rotatively supported within the opposite walls of housing 4a, a first rotor 4c in the form of a helical gear fixedly secured to output shaft 4b, a bore 4d formed in one of the walls of housing 4a corresponding to a portion thereof where one end of output shaft 4b is to be supported, four projections 4e provided at equiangular intervals on the outer surface of the wall of housing 4a around the peripheral portion of bore 4d, a support member 4f having generally a cylindrical shape so as to be loosely fit within opening 4d with a sufficient gap being left therebetween and fixedly mounted therein a radial bearing to rotatably carry output shaft 4b at the one end, support member 4f having a square flange portion symmetrical with the cylindrical portion thereof on the outer surface, bolts 4g each screwed into respective projections 4e so as to push against the respective side edges of the flange of support member 4f, an intermediate shaft 4h arranged in parallel with output shaft 4b and spaced apart therefrom and rotatively supported at opposite ends by the respective opposite walls of housing 4a, a second rotor 4i in the form of a helical gear fixedly secured to intermediate shaft 4h and in mesh with first rotor 4c, a third rotor 4j in the form of a helical gear fixedly secured to intermediate shaft 4h and spaced apart from second rotor 4i, an input shaft 4k arranged in parallel with intermediate shaft 4h and spaced apart therefrom and rotatively supported at opposite ends by the respective opposite walls of housing 4a, and a fourth rotor 4l in the form of a helical gear fixedly secured to input shaft 4k and in mesh with third rotor 4j. Reference numeral 5 denotes an electric motor mounted to housing 4a so as to drive input shaft 4k, an electromagnetic brake 6 being interposed therebetween. Reference numeral 7 denotes a traction sheave fixedly secured to output shaft 4b at the end opposite to support member 4f outside housing 4a, reference numeral 8 denotes a hoisting wire rope reeved around traction sheave 7, reference numeral 9 denotes an elevator car suspended from hoisting wire rope 8 at its one end, reference numeral 9a denotes a car sling, reference numeral 9b is a cab supported by car sling 9a through rubber vibration isolators 9c, and reference numeral 10 denotes a counter weight suspended from hoisting wire rope 8 at its other end.

Thus, upon energization of electric motor 5, the rotation of the motor transmitted to input shaft 4k is reduced by reduction gear 4 to be transmitted to traction sheave 7 through output shaft 4b in a known manner so that car 9 and counter weight 10 are moved in opposite directions through hoisting wire rope 8. In this case, unless the backlash of the first and second rotors 4c and 4i, etc. is appropriately adjusted, various difficulties such as pitching, abnormal vibration, etc. of car 9, abnormal noises, seizure of the gears, etc. may occur, resulting in abnormal abrasion and damage of the gears. Further, in the case where the adjustment of the meshing of the teeth of first and second rotors 4c and 4i is insufficient, abnormal abrasion of the teeth, etc. may result. In order to obviate these difficulties, in the conventional reduction gear, as stated above, it is so designed that one end of output shaft 4b is adapted to be displaced through support member 4f by moving it in a desired direction by means of the appropriate adjustment of bolts 4g, making the adjustment of the backlash, meshing conditions, etc. of the teeth of first and second rotors 4c and 4i possible.

However, in this arrangement the adjustment mechanism for the position of support member 4f relative to housing 4a by means of bolts 4g brings another disadvantage that since bolts 4g are subjected to a large load the load of traction sheave 7, i.e. the suspension load of hoisting wire rope 8, is limited by the maximum tolerable load of bolts 4g. Further, since on adjustment of the mesh, etc. of the teeth of first and second rotors 4c and 4i a displacement of several hundredths of a mm is necessary, the adjustment operation through standardized pitch bolts 4g is difficult and troublesome, thus revealing another disadvantage. On the other hand, if the bolts 4g have fine pitch threads it is very troublesome to displace support member 4f in any great amount, thereby dimenishing the workability of the device.

Laid-Open Japanese Patent Publication No. 113696/1981, filed on Feb. 12, 1980, laid-open on Sept. 7, 1981, entitled "A Traction Machine for an Elevator", discloses a traction machine which comprises a reduction gear provided with parallel shaft gears, a traction sheave, a brake means and a driving electric motor, but the reduction gear does not disclose a technique to support each end of at least one of the shafts by a pair of cylindrical support members which are provided with eccentric outer and inner peripheries, respectively, so as to be engaged with each other through these peripheries for the purpose of facilitating the adjustment of the distance between the two parallel shafts.

OBJECT AND SUMMARY OF THE INVENTION

It is a primary object of the present invention to provide a traction machine for an elevator of the type described above which can eliminate all of the defects in the conventional traction machine exemplified above.

It is another object of the present invention to provide a traction machine for an elevator which makes the adjustment of the meshing conditions, etc. of the rotors of the reduction gear easy so that normal traction operation of the elevator car is assured.

In accordance with the present invention, a traction machine for an elevator is provided wherein a reduction gear for the traction machine rotatively mounts first and second spaced, parallel shafts, the shafts fixedly securing thereon a first and a second rotor, respectively, so as to mesh with each other, and at least one of the shafts has each end rotatably supported by the wall of the reduction gear through a support element comprising a first and second support member, the first support member having an outer cylindrical periphery with an inner cylindrical periphery being formed therein eccentrically to the center of the outer cylindrical periphery, the inner cylindrical periphery being adapted to rotatably support the end of the shaft, and the second support member has an outer cylindrical periphery adapted to be rotatably received in a corresponding opening formed in the wall of the reduction gear and an inner cylindrical periphery being formed therein eccentrically to the center of the outer cylindrical periphery which is adapted to rotatively receive therein the first support member by its outer cylindrical periphery, whereby the first and second support members of the support member are adapted to be able to be fixedly secured to the wall of the reduction gear at a desired position rotating relative to each other as well as to the wall of the reduction gear.

BRIEF DESCRIPTION OF THE DRAWINGS

These as well as further objects, features and advantages of the present invention will be more fully understood by reference to the following detailed description of the presently preferred, but nonethless illustrative embodiments of the present invention when taken in conjunction with the accompanying drawings, wherein:

FIG. 6 is a side elevational view of FIG. 5 as viewed from the left-hand side thereof;

FIG. 7 is a side elevational view of FIG. 5 as viewed from the right-hand side thereof;

FIG. 8 is a view similar to FIG. 4 illustrating another embodiment of the traction machine in accordance with the present invention;

FIG. 9 is a view similar to FIG. 4 illustrating a still further embodiment of the present invention;

FIG. 10 is a side elevational view of FIG. 9 as viewed from the left-hand side thereof; and FIG. 11 is a longitudinal sectional view illustrating the principal parts of the traction machine pertaining to a further embodiment of the present invention.

DETAILED DESCRIPTION OF THE PREFERRED EMBODIMENTS

Figure 1:
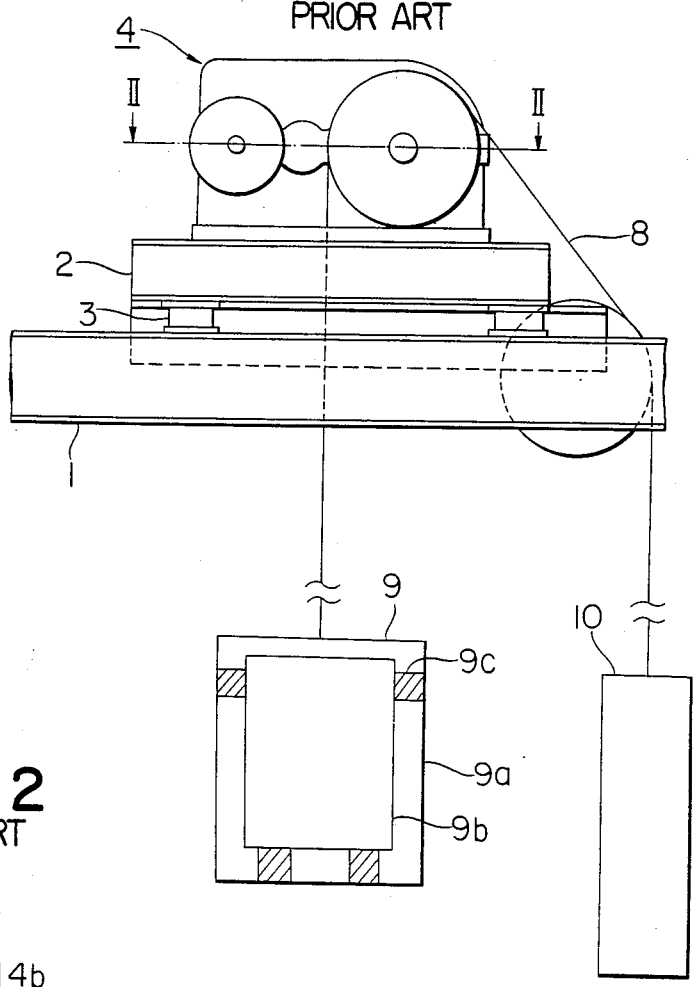
FIG. 1 is a schematical view illustrating the principal parts of a conventional traction machine for an elevator.
Figure 2:
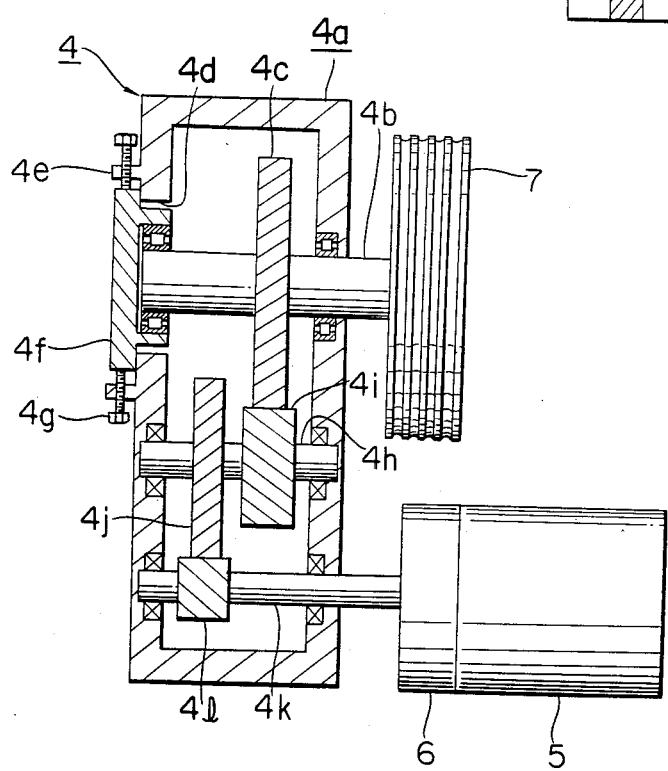
FIG. 2 is a cross-sectional view of the traction machine shown in FIG. 1 taken along the line II—II thereof.
Figure 3:
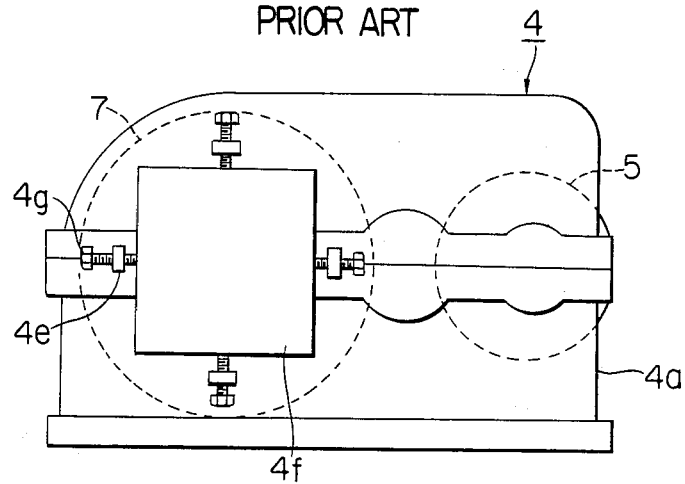
FIG. 3 is a side elevational view of the traction machine shown in FIG. 2 as viewed from the left-hand side thereof.
Figure 4:
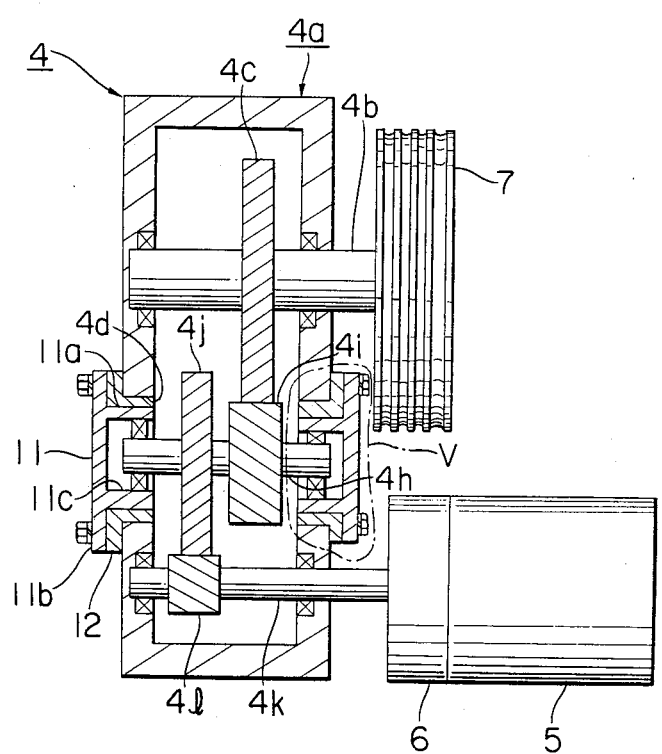
FIG. 4 is a view corresponding to FIG. 2 illustrating one embodiment of the traction machine in accordance with the present invention.
Figure 5:
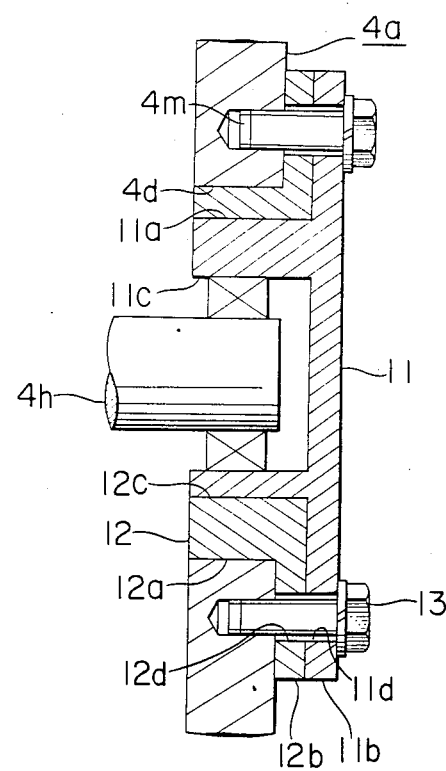
FIG. 5 is a partial enlarged view of the part of FIG. 4 enclosed by the dotted line V.

Referring now to FIGS. 4 to 7 of the attached drawings wherein one embodiment of the present invention is shown with identical or similar parts to those shown in FIGS. 1 to 3 bearing the same reference numerals as in FIGS. 1 to 3, reduction gear 4 is formed with circular bores $4d$ in the opposite parallel walls of housing $4a$, respectively, at positions confronting the ends of intermediate shaft $4h$, respectively, and a number of threaded holes $4m$ are formed in the walls of housing $4a$ around circular bores $4d$, respectively, at equi-angular intervals. Rotatably received in each of the bores $4d$, are first and second cylindrical support members 11 and 12 as follows: Second cylindrical support member 12 comprises a main cylindrical body having a cylindrical outer periphery $12a$ adapted to be rotatably received in bore $4d$ of housing $4a$, and a circular flange $12b$ integrally formed with the main cylindrical body at one end concentrically therewith and adapted to abut at one surface against the outer wall of housing $4a$. The main cylindrical body of second cylindrical support member 12 is formed with a cylindrical inner periphery $12c$ eccentrically with the center axis of the main cylindrical body. Circular flange $12b$ of second cylindrical member 12 has such a radial dimension that a number of bolt holes $12d$ can be formed so as to respectively correspond to threaded holes $4m$ formed in the wall of housing $4a$, bolt hole $12d$ preferably being of a circular cross section.

First cylindrical support member 11 comprises a main cylindrical body having a cylindrical outer periphery $11a$ corresponding to cylindrical inner periphery $12c$ of first cylindrical support member 12, and a disk-like circular flange $11b$ integrally formed concentrically with the main cylindrical body thereof. The main cylindrical body of first cylindrical support member 11 is formed with a bottomed cylindrical space having a cylindrical inner periphery $11c$ eccentrically with the center axis thereof and adapted to rotatively support one end of intermediate shaft $4h$ through a radial bearing. Circular flange $11b$ of first support member 11 has the same diameter as that of the circular flange $12b$ of second support member 12 so as to form a smooth common periphery and is similarly formed with bolt holes lid so as to respectively correspond to screw threaded holes $4m$ of housing $4a$, each bolt hole $11d$ being preferably of a radially oblong cross section.

On mounting first and second support members 11 and 12 to housing $4a$, after second support member 12 is received in bore $4d$ formed in the wall thereof with the surface of circular flange $12b$ confronting the wall being abutted thereagainst and then first support member 11 is introduced into second support member 12 by sliding outer cylindrical periphery $11a$ of the main cylindrical body of first support member 11 along inner cylindrical periphery $12c$ of the cylindrical main body of second support member 12 until circular flanges $11b$ and $12b$ come into contact, and a corresponding number of bolts 13 are loosely passed through bolt holes $11d$ and $12d$ to be screwed into threaded holes $4m$ so that first and second support members 11 and 12 are fixedly secured to the walls of housing $4a$.

Thus, intermediate shaft $4h$ is adapted to be rotatably supported at both ends in housing $4a$ through first and second support members 11 and 12. Rotations of first support member 11 relative to second support member 12 as well as second support member 12 relative to housing $4a$ displace the position of intermediate shaft $4h$ through the double eccentricity of inner cylindrical peripheries $11c$ and $12c$ of the respective first and second support member 11 and 12. Therefore, the backlash, the mesh, etc. of the teeth of first and second rotors $4c$ and $4i$ can be suitably adjusted by a simple operation. Moreover, since the radial load of intermediate shaft $4h$ can be carried by a large area such as the inner periphery of bore $4d$ of the wall of housing $4a$, the outer cylindrical periphery $11a$ of first support member 11, etc., a large load can be easily born so that the suspended load limitations on hoisting wire rope 8 are lessened. Additionally, in the embodiment illustrated, the mutual backlash, etc. of the teeth of the third and fourth gears $4j$ and $4l$ can be simultaneously adjusted by movement of intermediate shaft $4h$ together with the adjustment of the space between the first and second rotors $4c$ and $4i$.

Further, it is also possible that if first and second rotors 4c, 4i, etc. are designed so as to be at an optimum engaging condition at the time of assembly when the center line of intermediate shaft 4h is arranged above or below the plane connecting the center lines of output shaft 4b and input shaft 4k, then, when the teeth of first and second rotors 4c, 4i, etc. wear down, the optimum engaging conditions, etc. of first and second rotors 4c, 4i, etc. can be easily restored by causing the center line of intermediate shaft 4h to approach the plane connecting the center lines of output shaft 4b and input shaft 4k by the adjustment of first and second support members 11 and 12. It is also conceivable that when the eccentricities of first and second support members 11 and 12 are previously selected so that one of them is larger than the other the adjustment operation can be carried out efficiently in such a manner that when a large positional displacement is necessary the support member having the larger eccentricity is rotated, whereas when a small positional displacement is required the one having a smaller eccentricity is rotated. It should also be added that when a third support member similar to first and second support members 11 and 12 is provided so as to be relatively rotatably combined with members 11 and 12 in a similar manner, a finer adjustment can be realized than when only first and second support members 11 and 12 are combined.

Another embodiment of the present invention is shown in FIG. 8 wherein the parts similar or identical to those in the first embodiment shown in FIGS. 4 to 7 bear the same reference numerals as those in this figure.

In FIG. 8 the reference numeral 4b denotes an output shaft one end of which projects from traction sheave 7 in the direction opposite to housing 4a, reference numeral 4'a denotes a bearing support member integrally formed with housing 4a so as to constitute a part thereof and adapted to rotatably support the projecting end of output shaft 4b, reference numeral 4c denotes a first rotor fixedly secured to output shaft 4b in the form of a friction wheel, reference numeral 4i denotes a second rotor fixedly secured to intermediate shaft 4h in the form of a friction wheel urged toward first rotor 4c, reference numeral 4j denotes a third friction wheel fixedly secured to intermediate shaft 4h spaced apart from second rotor 4i, and reference numeral 4l denotes a fourth friction wheel fixedly secured to input shaft 4k and urged toward third friction wheel 4j. Further, as shown in FIG. 8, opposite ends of output shaft 4b are respectively rotatably supported by housing 4a and bearing support member 4'a, through first and second support members 11 and 12 in the same manner as in FIGS. 4 to 7.

Thus, in this embodiment opposite ends of output shaft 4b are respectively rotatably carried by frame 4a and bearing support member 4'a, through first as well as second support members 11 and 12. Therefore, in this case, the engagement condition between first and second rotors 4c and 4i can be adjusted by displacing the position of output shaft 4b through the manipulation of first and second support members 11 and 12. This adjustment must be made since if the distance between the center lines of first and second rotors 4c, 4i is not within a predetermined tolerance such troubles as a decrease in power transmission, abnormal vibration, noise, abrasion or breakage, etc. of the rotors occur. When the parallelism between the friction surfaces of first and second friction wheels 4c and 4i is not within a predetermined tolerance, abnormal abrasion of the friction surfaces, a decrease in the power transmission capacity, etc. also occur. The above various difficulties or defects can be compensated for by the displacement of output shaft 7 as described above. Thus, although no detailed explanation is given here, it will be apparent that this embodiment can reveal the operation or the effects similar to those in the first embodiment.

The third embodiment of the present invention is illustrated in FIGS. 9 and 10 with the parts identical or similar to those in FIGS. 4 to 7 being identically numbered.

In FIGS. 9 and 10 the reference numeral 4h denotes a first intermediate shaft rotatably supported by the housing 4a reference numeral 4'h denotes a second intermediate shaft similarly rotatably supported within housing 4a parallel with and spaced apart from first intermediate shaft 4h, reference numeral 4n denotes a first gear fixedly secured to output shaft 4b, reference numeral 4p denotes a second gear fixedly secured to first intermediate shaft 4h and in mesh with first gear 4n, reference numeral 4c denotes a first rotor fixedly secured to first intermediate shaft 4h apart from second gear 4p and in the form of a third gear, reference numeral 4i denotes a second rotor fixedly secured to second intermediate shaft 4'h and in the form of a fourth gear in mesh with third gear 4c or first rotor, and reference numeral 4l denotes a fifth gear fixedly secured to input shaft 4k in parallel with second intermediate shaft 4'h spaced apart therefrom and in mesh with second rotor 4i. As can be seen from FIG. 9 opposite ends of second intermediate shaft 4'h are respectively rotatably supported within the walls of housing 4a by first and second support members 11 and 12 just as for intermediate shaft 4h in the case of the first embodiment.

Thus, also in this embodiment both ends of second intermediate shaft 4'h are rotatably supported in housing 4a by first and second support members 11 and 12. Therefore, the engagement condition of the teeth of first and second rotors 4c and 4i can be adjusted by the displacement of second intermediate shaft 4'h through the manipulation of first and second support members 11 and 12. Although the detailed explanation therefor is omitted here, it will be apparent that this embodiment operates quite similarly to the case of the first embodiment shown in FIGS. 4 to 7, revealing similar effects.

Finally the fourth embodiment of the present invention is shown in FIG. 11 wherein parts identical or similar to those in the first embodiment shown in FIGS. 4 to 7 bear the same reference numerals as those in FIGS. 4 to 7.

In FIG. 11 the reference numeral 4c denotes a first rotor in the form of a worm wheel fixedly secured to an output shaft 4b rotatably mounted within housing 4a and reference numeral 4i denotes a second rotor in the form of a worm fixedly secured to an input shaft 4h at right angles to output shaft 4b in mesh with first rotor, i.e. worm wheel 4c.

As can be seen from FIG. 11, one end of output shaft 4b is rotatably supported by the wall of housing 4a and the other end thereof is rotatably supported by bearing support member 4'a disposed outside housing 4a so as to be integral therewith, both through first and second cylindrical support members 11 and 12. Therefore, although no detailed explanation is given here, it will be apparent that this embodiment operates similarly to the embodiment shown in FIGS. 4 to 7, revealing similar effects.

As will be clearly understandable from the embodiments described above the traction machine for an elevator in accordance with the present invention is summarized as follows: it is characterized in that a reduction gear has a first and a second rotor respectively fixedly secured on separate parallel spaced shafts, respectively, which are rotatably arranged within the gear housing, and that the parallel walls of the gear housing are respectively provided with first smaller and second larger cylindrical support members, the cylindrical main body of the former having an outer eccentric cylindrical periphery and that of the latter having an inner eccentric cylindrical periphery such that the inner eccentric cylindrical periphery of the second larger cylindrical support member rotatably receives therein the first smaller cylindrical support member by the outer periphery of its cylindrical body, and that the second larger, cylindrical support member is rotatably mounted in the bore correspondingly formed in the wall of the gear housing and the inner cylindrical periphery of the cylindrical main body of the first smaller cylindrical member rotatably receives therein the end of at least one of the shafts so that the shaft of the rotor can be displaced relative to the housing by the rotation of the support members relative to each other and/or to the housing.

From the foregoing it will be appreciated that the present invention allows the engagement condition of the first and second rotors of a reduction gear for an elevator to be appropriately adjusted by a simple operation, preventing the generation of any abnormal vibration, noise, etc. in the traction machine, and to prolong its life with minimum maintenance and expense. Further, since the load of the shaft on which the rotor is fixedly secured is carried by the surfaces of the first and second cylindrical support members a large load can be easily born, whereby a traction machine for an elevator is attained in which the limitations on the suspension loads are lessened.

While certain preferred embodiments of the present invention have been described and illustrated herein it will be understood that modification may be made without departing from the spirit of the present invention.

What is claimed is:

1. A traction machine for an elevator, comprising:
   a. a housing having walls having opposing bores therein and evenly spaced threaded holes surrounding said bores;
   b. reduction gear means having first and second spaced parallel shafts, each rotatably supported at each end thereof by said walls; and
   c. a first and second mutually engaging rotors respectively fixedly secured to said first and second shafts for rotation therewith; said reduction gear means further comprising first and second rotative support means at the respective ends of at least one shaft of said first and second shafts, each of said first and second support means including:
      (1) a first cylindrical support member having:
         (i) a first main cylindrical body having a first outer cylindrical periphery and a first cylindrical inner periphery eccentric with the center axis of said first outer periphery rotatively supporting a corresponding end of said one shaft, and
         (ii) a first annular radially outwardly extending flange at an end of said first main body having first through-holes therein evenly circumferentially spaced at the radial periphery thereof; and
      (2) a second cylindrical support member having
         (i) a second main cylindrical body having a second outer cylindrical periphery, rotatively fit in a corresponding one of said bores and a second inner cylindrical periphery eccentric with the center axis of said second outer periphery, said second inner periphery rotatively receiving said first outer periphery of said first main body, and
         (ii) a second annular radially outwardly extending flange at an end of said second main body adjacent said first annular flange, having second through-holes therein evenly circumferentially spaced at the radial periphery thereof so as to be rotatively alignable with said first through-holes; and
   d. means for selectively fixing said first and second support members at desired angular orientations with respect to the respective center axes of said first and second outer peripheries said selectively fixing means including bolts having threaded ends, said bolts loosely passing through aligned first and second through-holes in said first and second flanges, removably screwed into said threaded holes in said walls so as to secure said first and second cylindrical support members to said housing;
   said reduction gear means further comprises a third shaft parallel to and spaced from said first and second shafts, rotatably supported at each end thereof by said walls, and a third rotor fixedly secured to said third shaft for rotation therewith, said second shaft being positioned intermediate said first and third shafts and having at least one rotor, including said second rotor, fixedly secured to said second shaft for rotation therewith, engaged with said third rotor; said at least one shaft including said second shaft.

2. A traction machine for an elevator as claimed in claim 1 wherein said first and second rotors are helical gears, in mesh with each other.

3. A traction machine for an elevator as claimed in claim 1 wherein said first and second rotors are friction wheels forcedly engaged with each other at their peripheries.

4. A traction machine as in claim 1, wherein at least one of said first through-holes and second through-holes comprise radially oblong through-holes.

5. A traction machine for an elevator, comprising:
   a. a housing having walls having opposing bores therein and evenly spaced threaded holes surrounding said bores;
   b. reduction gear means having first and second spaced parallel shafts, each rotatably supported at each end thereof by said walls; and
   c. first and second mutually engaging rotors respectively fixedly secured to said first and second shafts for rotation therewith; said reduction gear means further comprising first and second rotative support means at the respective ends of at least one shaft of said first and second shafts, each of said first and second support means including:
      (1) a first cylindrical support member having:
         (i) a first main cylindrical body having a first outer cylindrical periphery and a first cylindrical inner periphery eccentric with the center axis of said first outer periphery rotatively supporting a corresponding end of said one shaft, and (ii) a first annular radially outwardly extending flange at an end of said first main body having first through-holes therein evenly circumferentially spaced at the radial periphery thereof; and (2) a second cylindrical support member having (i) a second main cylindrical body having a second outer cylindrical periphery, rotatively fit in a corresponding one of said bores and a second inner cylindrical periphery eccentric with the center axis of said second outer periphery, said second inner periphery rotatively receiving said first outer periphery of said first main body, and (ii) a second annular radially outwardly extending flange at an end of said second main body adjacent said first annular flange, having second through-holes therein evenly circumferentially spaced at the radial periphery thereof so as to be rotatively alignable with said first through-holes; and d. means for selectively fixing said first and second support members at desired angular orientations with respect to the respective center axes of said first and second outer peripheries, said selectively fixing means including bolts having threaded ends, said bolts loosely passing through aligned first and second through-holes in said first and second flanges, removably screwed into said threaded holes in said walls so as to secure said first and second cylindrical support members to said housing, wherein at least one of said first through-holes and second through-holes comprise radially oblong through-holes.

6. A traction machine as in claim 5, wherein said reduction gear means further comprises a third shaft parallel to and spaced from said first and second shafts, supported rotatably at each end thereof by said walls, a third rotor fixedly secured to said third shaft for rotation therewith, said second shaft being positioned intermediate said first and third shafts and having at least one rotor, including said second rotor, fixedly secured to said second shaft for rotation therewith, engaged with said third rotor; said at least one shaft including said second shaft.

7. A traction machine for an elevator as claimed in claim 5 wherein said first and second rotors are helical gears in mesh with each other.

8. A traction machine for an elevator as claimed in claim 5 wherein said first and second rotors are friction wheels forcedly engaged with each other at their peripheries.

9. A traction machine for an elevator, comprising:

a. a housing having a housing wall having a first bore therein and first evenly spaced threaded holes surrounding said first bore;

b. bearing support means having a bearing support wall integral with and outside of said housing, having a second bore opposing said first bore and second evenly spaced threaded holes surrounding said second bore;

c. reduction gear means having first and second spaced shafts rotatably supported in said housing, at least one shaft of said first and second shafts being rotatably supported at one end by said walls and at the other end by said bearing support means outside said housing;

d. first and second mutually engaging rotors respectively fixedly secured to said first and second shafts for rotation therewith inside said housing; said reduction gear means further comprising first and second rotative support means at the respective ends of said at least one shaft, each of said first and second support means including:

(1) a first cylindrical support member having:

(i) a first main cylindrical body having a first outer cylindrical periphery and a first cylindrical inner periphery eccentric with the center axis of said first outer periphery, rotatively supporting a corresponding end of said one shaft, and (ii) a first annular radially outwardly extending flange at an end of said first main body, having first through-holes therein evenly circumferentially spaced at the radial periphery thereof; and (2) a second cylindrical support member having:

(i) a second main cylindrical body having a second outer cylindrical periphery, rotatively fit in a corresponding one of said bores and a second inner cylindrical periphery eccentric with the center axis of said second outer periphery, said second inner periphery rotatively receiving said first outer periphery of said first main body, and (ii) a second annular radially outwardly extending flange at an end of said second main body adjacent said first annular flange, having second-through holes therein evenly circumferentially spaced at the radial periphery thereof so as to be rotatively alignable with said first through-holes; and e. means for selectively fixing said first and second support members at desired angular orientations with respect to the respective center axes of said first and second outer peripheries, said selectively fixing means including bolts having threaded ends, said bolts loosely passing through aligned first and second through-holes in said housing and bearing support walls so as to respectively secure said first and second cylindrical support members to said housing and bearing support means, wherein at least one of said first through-holes and second through-holes comprise radially oblong through-holes.

10. A traction machine for an elevator as claimed in claim 9 wherein said one of said first and second shafts which is rotatably supported at each end by said first and second cylindrical support members is disposed at right angles to the other of said first and second shafts, and said first and second rotors are respective a worm wheel, and a worm in mesh with said worm wheel, respectively fixed secured to said first and second shafts.

* * * * *